Patented Nov. 4, 1947

2,430,190

UNITED STATES PATENT OFFICE 2,430,190

ALKYLATION OF PHENOLS

Louis Schmerling and Vladimir N. Ipatieff, Riverside, Ill., assignors to Universal Oil Products Company, Chicago, Ill., a corporation of Delaware No Drawing. Application August 30, 1943, Serial No. 500,556

9 Claims. (Cl. 260—624)

This invention relates to the alkylation of phenols. It is more particularly concerned with the production of mono- and polyalkyl phenols by the interaction of a phenol with an alkylating agent in presence of a suitable catalyst.

Broadly, the invention comprises contacting a phenol with an alkylating agent under alkylating conditions of temperature and pressure in the presence of an alkylating catalyst consisting essentially of a hydrogen halide selected from the group consisting of hydrogen chloride and hydrogen bromide.

In one specific embodiment the present invention comprises a process for producing alkyl phenols wherein a phenol and an alkylating agent are caused to react at a temperature of from about 100° C. to about 500° C. in the presence of a contact material and an alkylating catalyst consisting essentially of a substantially anhydrous hydrogen halide selected from the group consisting of hydrogen chloride and hydrogen bromide.

The phenols constitute an important class of chemical compounds which occur in varying amounts in the products obtained when distilling various carbonaceous materials such as coal, shale, lignite, peat, wood, etc. Many of these individual compounds and the commercial mixtures obtained from primary distillation products have value as germicides and insecticides and as intermediate products for the manufacture of more complicated substances such as, for example, certain resinous condensation products produced by reacting phenols with aldehydes. Alkylated phenols or mixtures thereof, such as produced by the process of the present invention, may be utilized as inhibitors, insecticides, germicides, etc., and as intermediates in the synthesis of dyes, resins, etc.

Phenols which are alkylatable by olefinic hydrocarbons and other alkylating agents as hereinafter set forth have at least one hydroxy group attached directly to an aromatic nucleus. The term phenol as used in this specification and in the claims relates to any of a series of hydroxyl derivatives of benzene, naphthalene, or their homologs formed by replacing one and generally not more than four of the benzene hydrogens by a hydroxyl group. The monohydric phenols comprise phenol, cresols, xylenols, etc., while the dihydric phenols include pyrocatechol, resorcinol, and hydroquinone. Pyrogallol is an example of a trihydric phenol.

The process of this invention is also applicable to the alkylation of certain substituted phenols such as bromo-phenols, chloro-phenols, aminophenols, etc., although not necessarily under the same conditions of operation utilizable with the phenols themselves. Many mono-alkylated phenols may be converted into more-highly alkylated phenols by the process of this invention.

Olefinic hydrocarbons which may be employed as alkylating agents comprise mono-olefins and poly-olefins. The olefins may be either normally gaseous or normally liquid and comprise, for example, ethylene and its higher homologs, both gaseous and liquid, the latter including various polymers of normally gaseous olefins. These different olefinic hydrocarbons and those mentioned hereinafter are not necessarily equivalent in their action as alkylating agents since different operating conditions may be required in each case. Cyclic olefins may also serve in alkylating phenols but generally under conditions of operation different from those employed when alkylating phenols by non-cyclic olefins. Other olefinic hydrocarbons which may be interacted with the above indicated phenols include conjugated diolefins such as butadiene and isoprene, also non-conjugated diolefins, and other polyolefins. Some of the olefinic hydrocarbons utilizable as alkylating agents are present in products of thermal and catalytic cracking of oils, in those obtained by dehydrogenating paraffinic and olefinic hydrocarbons, or in the products resulting from dehydrating alcohols.

Alkylation of phenols may also be effected in the presence of catalysts hereinafter described by charging with the phenol other alkylating agents which may be considered as capable of producing olefinic hydrocarbons under the operating conditions chosen for the reaction. Alkylating agents which contain an alkoxy group may be used, e. g., alcohols, ethers, and esters, which are capable of undergoing dehydration or splitting to olefinic hydrocarbons containing at least two carbon atoms per molecule. It is also possible to employ alkyl halides as alkylating agents in the present invention. Among the alkyl halides which may be employed are propyl, butyl, amyl, etc., chlorides and bromides. As hereinafter described, many of the alkyl halides are particularly useful alkylating agents since they also serve as a convenient source of hydrogen halide catalyst.

We have found that although the reaction between a phenol and an alkylating agent, such as an olefinic hydrocarbon, proceeds to a reasonable extent in the presence of hydrogen chloride or hydrogen bromide at a temperature within the range of from about 100° C. to about 500° C., a vast improvement in the reaction is effected by employing a suitable contact material in the reaction zone. Since hydrogen chloride and hydrogen bromide are substantially in the vapor phase under conditions of temperature and pressure ordinarily employed, it is extremely desirable to have present a solid contacting agent which affords a large reaction surface. Among the various contact materials which may be used the following are considered as representative although it is by no means intended to place the materials on an equivalent basis: silica gel, alumina, bauxite, zinc oxide, ferric oxide, magnesia, diatomaceous earth, various natural clays, kieselguhr, charcoal, activated carbon, graphite, silica-alumina composites, silica - alumina - zirconia, composites, etc.

Although either hydrogen chloride or hydrogen bromide may be employed as the effective alkylating catalyst in the present process, we generally prefer to employ hydrogen chloride since it is cheaper and more generally available. A very convenient method of providing hydrogen chloride or hydrogen bromide catalyst for the alkylation reaction comprises introducing an alkyl chloride or alkyl bromide into the alkylation zone along with the phenol and alkylating agent. Under the conditions of the reaction the alkyl halide decomposes or otherwise reacts to form the desired hydrogen halide catalyst. Since many of the alkyl halides, e. g., isopropyl chloride, isopropyl bromide, butyl chloride, butyl bromide, etc., are normally in the liquid state, their use will in many cases be more convenient than the use of gaseous hydrogen chloride or hydrogen bromide. In those cases where an alkyl halide is employed as the source of hydrogen halide catalyst it will be apparent that the alkyl halide in addition to being a source of catalyst is also an alkylating agent. Presumably the alkyl halide reacts in situ to release hydrogen halide catalyst and olefinic fragments which then react with the phenol. The alkyl halide thus introduced may also comprise the sole alkylating agent in addition to its role as a source of hydrogen halide catalyst, or it may be used primarily as a source of catalyst in conjunction with a separately added alkylating agent.

In effecting reaction between phenols and alkylating agents, such as olefinic hydrocarbons, according to the process of the present invention, the exact method of procedure varies with the nature of the reacting constituents. A simple procedure utilizable in the case of a phenol which is normally liquid or, if solid, is readily soluble or dispersible in a substantially inert liquid, and a normally gaseous or liquid olefinic hydrocarbon consists in contacting the phenol and olefinic hydrocarbons with the hydrogen halide catalyst and a contact agent at a temperature of from about 100° C. to about 500° C. but preferably between about 150° C. and about 300° C. under a pressure of from substantially atmospheric to approximately 100 atmospheres. The operating temperature depends to a large extent on the particular phenol and alkylating agent which are employed. For example, in the case of olefinic alkylating agents, ethylene will require a higher temperature than the more reactive butylenes. Intimate contact of the reacting components with the catalyst is effected by passing the reaction mixture through a fixed bed of the contact material, or the reacting components and catalyst may be mixed with finely divided contact material in a substantially fluid type of operation. In the mixture subjected to alkylation treatment it is preferable to have present between about 1 and about 20 molecular proportions of phenol per 1 molecular proportion of olefinic hydrocarbon in order to diminish olefin polymerization and to favor interaction of olefinic hydrocarbon with phenol. In any continuous method of operation the hydrogen halide catalyst is readily separated from the reaction products and returned to the alkylation zone.

Thus, a phenol or mixture of phenols and a fraction containing olefinic hydrocarbons are commingled with HCl or HBr and passed through a reactor containing a contact material such as alumina, or at least a portion of the phenol is charged to such a reactor, while the fraction containing olefinic hydrocarbons as such or preferably diluted by another portion of the phenol being treated may be introduced at various points between the inlet and outlet of the reaction zone in such a way that the reaction mixture being subjected to contact with the granular alumina will at all times contain a relatively low proportion of the olefinic hydrocarbon and thus favor alkylation rather than polymerization. The phenol being treated may be in liquid or molten condition or it may be dissolved or dispersed in a substantially inert liquid such as a liquid parafin hydrocarbon fraction.

While the method of passing the phenols and olefinic hydrocarbons, either together or countercurrently, through a suitable reactor containing the contact material is generally customary procedure, the interaction of these compounds may also be effected in a closed vessel in which some of the reacting constituents are in liquid phase and in which the contact material is preferably in finely divided form and is maintained in dispersion or suspension by some method of agitation. The choice of operating procedure is dependent upon the circumstances such as the temperature, pressure, and activity of the catalyst found to be most effective for producing the desired reaction between particular phenols and olefinic hydrocarbons.

While the reaction is not understood completely, a typical alkylation of a phenol apparently involves the addition of the phenol to a double bond of an olefinic hydrocarbon to produce an alkylated phenol which may in turn undergo further reaction with 1 or more molecular proportions of olefinic hydrocarbon thus producing di-alkylated and poly-alkylated phenols. In case the alkylating agent is a diolefin or other polyolefin, the interaction with a phenol may involve not only alkylation but possibly polymerization. Thus, phenol and butadiene may give a substantial yield of butenyl phenols which polymerize. Within certain limits, however, it is possible to produce mainly mono - alkylated phenols by proper adjustment of catalyst activity, ratio of phenol to olefinic hydrocarbons, operating conditions of temperature, pressure, rates of feed of the reacting components, etc.

The reaction between a phenol and a hexene or other normally liquid olefin or higher molecular weight may involve not only addition of phenol and olefinic hydrocarbons but also a depolymerization or splitting of the olefinic hydrocarbon into olefinic fragments of lower molecular weights which react with the phenolic compound to produce alkylated phenols. Thus, phenol and dis-isobutene or tri-isobutene react and yield tertiary butyl phenol and poly-tertiary butyl phenols, while nonene and phenol yield both butyl and amyl phenols by so-called depoly-alkylation.

In general, the products formed by interaction of an olefinic hydrocarbon with a molal excess of a phenol are separated from the unreacted phenol and hydrogen halide catalyst by distillation. The unreacted phenol, the hydrogen halide catalyst, and, if desired, the poly-alkylated phenols formed are returned to the process and mixed with additional quantities of the olefinic hydrocarbons and phenol being charged to the contact material. This recycling of poly-alkylated phenols sometimes aids in the production of mainly mono-alkylated phenols and depresses the formation of more-highly alkylated derivatives. The total alkylated product thus freed from the excess of the originally charged phenol is separated into desired fractions by distillation at ordinary or reduced pressure or by other suitable means.

The following examples are presented to illustrate the nature of the present invention although it is not intended to restrict the scope of the invention to the details of these examples.

*Example I*

A rotating autoclave provided with a glass liner was charged with 40 grams of phenol, 26 grams of propylene, and 10 grams of granular alumina. The autoclave was heated to 150° C. for one hour and then at 200° C. for 3 hours under the vapor pressure of the mixture in the autoclave.

At the conclusion of the run the contents of the autoclave were removed and no alkylation products were found. Approximately 33 grams of crystalline phenol and 24 grams of propylene were recovered.

It is thus apparent from this experiment that alumina alone is not a suitable alkylating catalyst for phenols under the conditions used.

*Example II*

In the same equipment and under similar conditions of time, temperature, and pressure as described in Example I, 40 grams of phenol and 20 grams of propylene were contacted with 10 grams of granular alumina and 5 grams of isopropyl chloride.

The liquid product of the run was separated into an alkali soluble portion and an alkali insoluble portion and each fraction was further distilled. The alkali soluble portion comprised about 4 grams of isopropyl phenol, and the alkali insoluble portion which amounted to 33 grams consisted chiefly of isopropyl isopropylphenyl ether, the remainder being chiefly higher alkylated products.

Comparing this experiment with Example I it is evident that hydrogen chloride as produced in situ from the isopropyl chloride charged is an effective catalyst for the alkylation of phenols when a suitable contact materal such as alumina is employed.

*Example III*

In this experiment 40 grams of phenol was reacted with 20 grams of propylene in the presence of 5 grams of isopropyl chloride and 10 grams of silica gel in the same apparatus and under the same conditions described in Example I.

The alkali soluble fraction of the reaction products comprised 2 grams of isopropyl phenol, and 37 grams of alkali insoluble fraction was also recovered which consisted chiefly of isopropyl isopropylphenyl ether.

*Example IV*

In this run the same apparatus and operating conditions were employed as in Example I. About 40 grams of phenol was contacted with 18 grams of propylene along with 5 grams of added isopropyl chloride. No contact material such as alumina or silica was employed in this experiment.

Although the results were not as good as those obtained in Examples II and III nevertheless an alkali soluble reaction product was obtained which contained approximately 1 gram of isopropyl phenol. About 14 grams of alkali insoluble reaction product was obtained which comprised substantial amounts of isopropyl phenyl ether and isopropyl isopropylphenyl ether.

*Example V*

In this experiment the glass lined rotating autoclave was charged with 40 grams of phenol, 35 grams of tertiary butyl alcohol, 5 grams of tertiary butyl chloride, and 10 grams of granular alumina. The autoclave was heated to 125° C. for 4 hours.

The reaction product was separated into an alkali soluble portion comprising about 1 gram of butyl phenol and 44 grams of an alkali insoluble portion containing alkyl phenyl ethers.

We claim as our invention:

1. A process for alkylating phenols which comprises reacting a phenol with an olefin under alkylating conditions in the presence of an alkyl halide and a solid oxide contact material selected from the group consisting of silica and alumina.

2. A process for alkylating phenols which comprises reacting a phenol with an olefin at a temperature of from about 100° C. to about 500° C. in the presence of an alkyl halide and a solid oxide contact material selected from the group consisting of silica and alumina.

3. A process for alkylating phenols which comprises reacting a phenol with an olefin under alkylating conditions in the presence of an alkyl chloride and a solid oxide contact material selected from the group consisting of silica and alumina.

4. A process for alkylating phenols which comprises reacting a phenol with an olefin under alkylating conditions in the presence of an alkyl bromide and a solid oxide contact material selected from the group consisting of silica and alumina.

5. A process for alkylating phenols which comprises reacting a phenol with an olefin under alkylating conditions in the presence of alumina and an alkyl halide.

6. A process for alkylating phenols which comprises reacting a phenol with an olefin under alkylating conditions in the presence of silica and an alkyl halide.

7. An alkylation process which comprises reacting phenol with an olefin at a temperature of from about 100° C. to about 500° C. in the presence of an alkyl halide and a solid oxide contact material selected from the group consisting of silica and alumina.

8. An alkylation process which comprises reacting phenol with propylene at a temperature of from about 100° C. to about 500° C. in the presence of alumina and isopropyl chloride.

9. An alkylation process which comprises reacting phenol with propylene at a temperature of from about 100° C. to about 500° C. in the presence of silica and isopropyl chloride.

LOUIS SCHMERLING.
VLADIMIR N. IPATIEFF.

REFERENCES CITED

The following references are of record in the file of this patent:

UNITED STATES PATENTS

| Number | Name | Date |
| --- | --- | --- |
| 2,161,826 | Kyrides | June 13, 1939 |
| 2,189,805 | Kyrides | Feb. 13, 1940 |
| 2,283,465 | Shoad | May 19, 1942 |
| 2,291,804 | Gump | Aug. 4, 1942 |